UNITED STATES PATENT OFFICE.

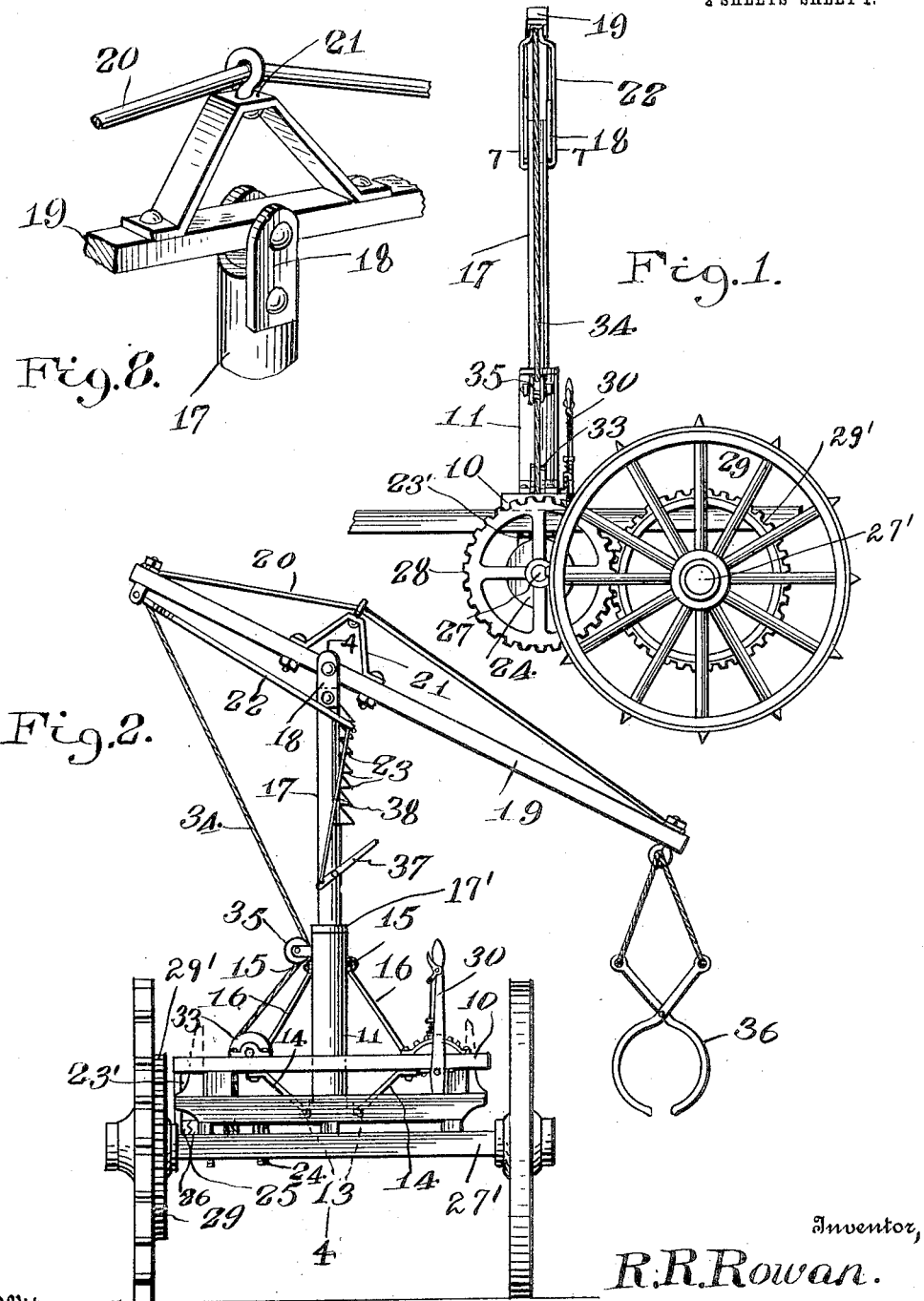

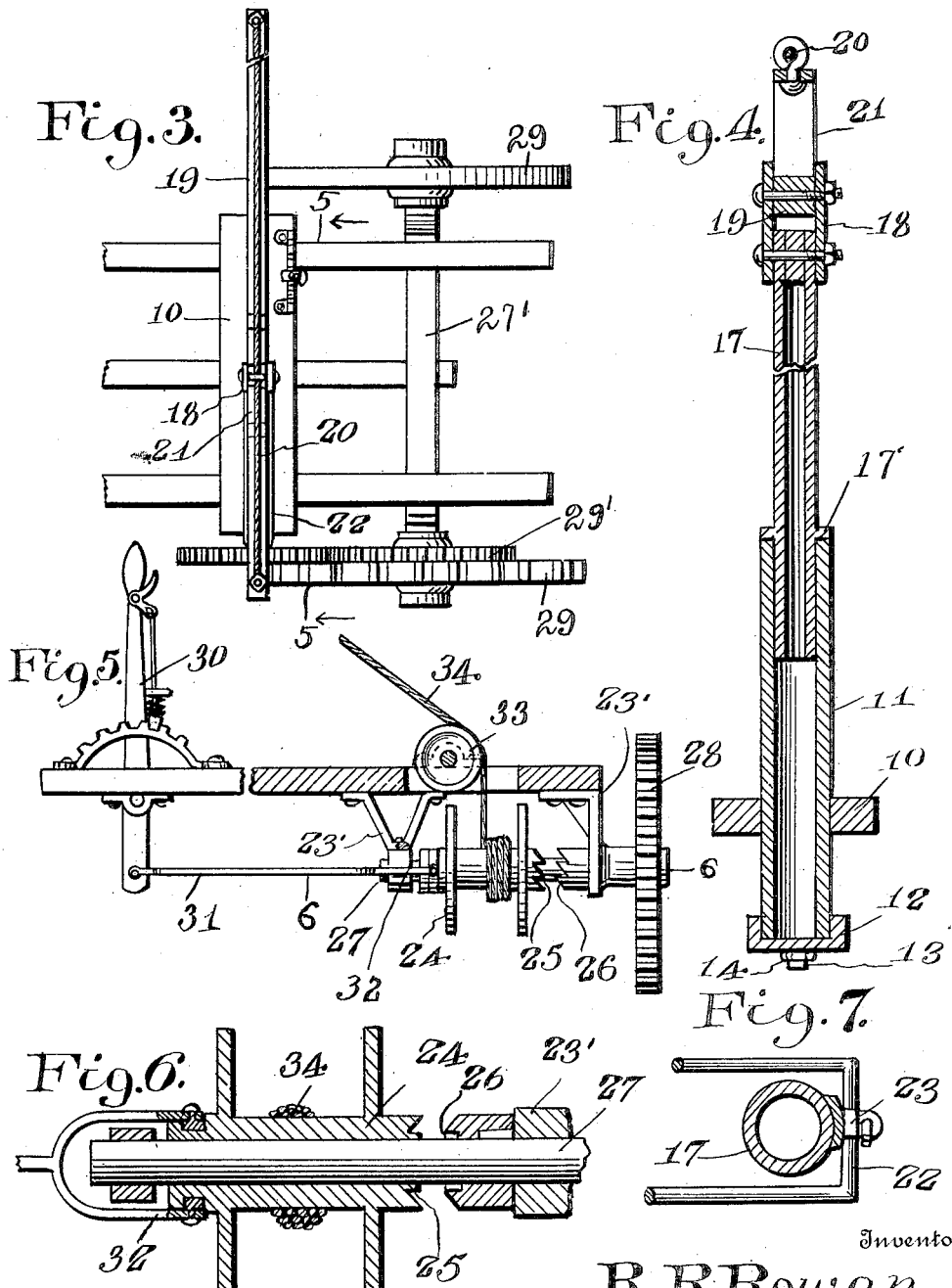

RUSSELL R. ROWAN, OF VERDI, KANSAS.

FODDER-LOADER.

1,107,361.  Specification of Letters Patent.  Patented Aug. 18, 1914.

Application filed November 19, 1912. Serial No. 732,341.

*To all whom it may concern:*

Be it known that I, RUSSELL R. ROWAN, a citizen of the United States, residing at Verdi, in the county of Ottawa, State of Kansas, have invented certain new and useful Improvements in Fodder-Loaders; and I do hereby declare the following to be a full, clear, and exact description of the invention, such as will enable others skilled in the art to which it appertains to make and use the same.

This invention relates to improvements in fodder loaders, and has particular reference to a device of this character whereby a load after being placed on the machine can be elevated to the proper point for delivery, while the machine is traveling to the point of delivery.

Other objects and advantages will be apparent from the following description and with particular reference to the accompanying drawings.

In the drawings: Figure 1 is a side elevation of the machine made in accordance with my invention, Fig. 2 is a rear elevation, Fig. 3 is a top plan view, Fig. 4 is a vertical longitudinal sectional view on the line 4—4 of Fig. 2, Fig. 5 is a transverse sectional view on the line 5—5 of Fig. 3, Fig. 6 is a horizontal sectional view on the line 6—6 of Fig. 5, enlarged, Fig. 7 is a section on the line 7—7 of Fig. 1, and Fig. 8 is a fragmentary view of the support and arm, showing the arm in elevated position.

Referring particularly to the accompanying drawings, 10 represents a sill which is adapted to be bolted onto an ordinary hay rack, said sill being provided with a central opening to receive therethrough the vertical stationary tube member 11. The lower end of this tube is seated within a cap 12, which is provided with perforated ears 13, for the reception of brace rods 14, the opposite ends of said rods being secured to the said sill 10. Similar ears 15 are formed near the upper end of the tube 11 to which braces 16 are secured, the other ends of said braces being also secured to the sill 10. Telescoped into the tube 11 is a bar or tube 17, which forms the standard of the lifter or derrick device. On the tube 17 is formed a flange 17' which rests on the upper end of the tube 11, and serves to support the tube 17 at the proper height. Pivotally mounted on the upper end of the member 17 by means of the clip 18 is an arm or beam 19, suitably braced by means of the truss rod 20, said rod being supported in the center by the bracket 21. Pivotally mounted on one end of the arm or beam 19 is an elongated loop 22, the said loop embracing the said member 17 and engaging, with its closed portion, the rack teeth 23 formed on the said bar or tube 17. Mounted in suitable brackets 23' below the sill 10 is a winding drum 24, one end of said drum being provided with a clutch face 25 for engagement with the clutch face 26 keyed on the shaft 27, said shaft being arranged in parallel relation with the axle 27' of the vehicle. On the outer end of the shaft is a pinion 28, formed integrally with the clutch member 26. On the axle 27' are the ground engaging wheels 29. Secured on the wheels 29 is a pinion 29' which meshes with the pinion 28. Pivotally mounted on the sill is an operating lever 30 suitably connected to a link 31 carrying a forked member 32 which engages with the grooved end of said drum 24, and by means of which the drum is moved longitudinally on the axle to move its clutch face 25 toward and away from the clutch face 26. A guide pulley 33 is suitably mounted on the sill, a cable 34 being secured at one end to the drum and passing over the pulley 33, the other end of the said cable being secured to the end of the arm 19 to which the loop 22 is secured. A second pulley 35 is mounted on the stationary tubular member 11 and guides the cable 34. On the opposite end of the arm 19 is mounted a suitable sling 36 for holding the fodder or products to be conveyed.

In the operation of the device when a load is to be carried, the same is placed in the sling 36, after which the lever 30 is shifted to engage the clutch faces. The movement of the rack toward the point at which the load is to be deposited causes the rotation of the pinion 28 and the shaft 27 with the consequent rotation of the drum 24 and the winding of the cable 34. The winding of the cable pulls downwardly on the loop carried end of the arm 19 and raises the load. At the same time the closed end of the loop 22 slides down and engages one of the teeth 23 farther down on the member 17, and effectively suspends the arm in a horizontal position, so that the load may be carried in the proper elevated position to the point of deposit. The arm is then held in elevated position, and the vehicle moved toward the point where the load is to be deposited. To deposit the load I provide a releasing device, which consists of a pivoted lever 37 mounted on the member 17 and a link 38 pivotally connected to the said lever at one end and to the loop 22 at the other end so that upon movement of the lever 37, the loop 22 may be quickly disengaged from the ratchet teeth 23 and permit the loaded end to fall and deposit the load.

What is claimed is:

A lifting and conveying device comprising a support, a vertical tubular member carried by the support, a second tubular member telescopically arranged in the first tubular member, a flange carried by the second tubular member and resting on the upper end of the first tubular member, a rocking crane arm pivotally mounted on the upper end of the second tubular member, a plurality of ratchet teeth arranged in a vertical line on the upper portion of the second tubular member, a yoke member pivotally carried by one end of the arm and straddling the said tubular member, the transverse portion of the yoke engaging with the ratchet teeth, a lever pivotally carried by the tubular member, and a link connected to the lever and to the transverse portion of the yoke.

In testimony whereof, I affix my signature, in the presence of two witnesses.

RUSSELL R. ROWAN.

Witnesses:
J. A. NEELY,
GEO. P. KUBOCH.

---

Copies of this patent may be obtained for five cents each, by addressing the "Commissioner of Patents, Washington. D. C."